3,095,346
METHOD OF PRODUCING SHAPED ASBESTOS-CEMENT ARTICLES
Nicholas M. Sfiscko, Manville, Reynold Nebel, New Brunswick, and William L. Van Derbeek, Short Hills, N.J., assignors to Johns-Manville Corporation, New York, N.Y., a corporation of New York
No Drawing. Filed Feb. 11, 1959, Ser. No. 792,482
1 Claim. (Cl. 162—154)

This invention relates to methods of producing shaped asbestos-cement articles, e.g., pipe, construction boards, and the like, by filtration of aqueous slurries comprising asbestos fibers and hydraulic cement dispersed in water.

FIELD OF THE INVENTION

A variety of different products are produced from intimate mixtures of asbestos fibers and Portland cement. An established and extensively used method for making these asbestos-cement products involves the steps of forming an aqueous slurry of asbestos fibers and Portland cement in water, flowing the slurry onto a filter element upon which the dispersed solids of the slurry may be collected, removing water in the slurry through the filter element by filtration, and then removing the formed mass of asbestos fibers and cement from the filter element. Because of inhibition of the filtering by the asbestos fibers and finely divided cement particles, there are very practical limitations upon the thicknesses of the resulting layers which can be collected on filter elements in this fashion. Thus, as the collected mass builds up on the filter element, the rate of filtration rapidly decreases, making it impractical to form structures of any great thickness with a rate of throughput which must be obtained in commercial operations. Accordingly, it is customary in the manufacture of this type of product by the slurry filtration method to laminate together sufficient asbestos-cement layers to form the ultimate thickness desired in the final product. In the case of sheets, a plurality of individually formed layers produced on separate filtering elements can be simultaneously superimposed to form the board or sheet of desired thickness. On the other hand, asbestos-cement pipe can be made by spirally winding upon a mandrel a continuous sheet formed upon a single filter element or spirally winding superimposed plurality of sheets formed upon separate filter elements. The general methods of this type used in producing abestos-cement pipe and other products are described in detail in U.S. Patents 2,182,353; 2,246,537 and 2,322,592.

Because of competition and related products made of entirely different substances, e.g., metal, plastics or the like, it is important that the manufacturer of the asbestos-cement products be able to make high quality products possessing the necessary structural and other qualifications at the lowest possible cost. Since the machinery and apparatus use in the production of any product constitutes a major investment in the manufacture of the product, the greater the number of items per unit of equipment which can be turned out per unit of time, the lower will be the cost of the production of the article. Furthermore, if the particular manufacturing procedure in question involves material losses or waste, anything which will eliminate or mitigate these losses will also help to reduce production costs.

As previously mentioned, rate of filtration of aqueous asbestos fiber-cement slurries has constituted a major problem in the production of asbestos-cement products by the aqueous slurry filtration procedures. Rate of filtration of the slurries can be controlled to some extent by the grade of asbestos fibers employed in the slurries. Thus, some asbestos fibers are relatively harsh and form slurries which filter more rapidly than finer or more pliable asbestos fibers. Control or improvement of the filtration rate by exclusive use of the more rapidly filtering fibers, however, is not desirable from a manufacturing viewpoint because such fibers are relatively more expensive than the slower filtering varieties. In other words, it is possible to reduce the cost of asbestos-cement pipes and similar products, if means can be found for increasing the rate of filtration of the asbestos-cement slurries containing large percentages of the slower filtering, less expensive asbestos fibers, since the material cost of the pipe or other products will be lowered.

Attempts have been made to increase the filtering rates of the asbestos-cement slurries by adding small amounts of modifying agents to the slurries. For example, it has been suggested in U.S. Patent 2,220,386, to add about 0.2 to 1% by weight of certain organic sulphates or sulfonates to the dispersion of asbestos fibers and cement prior to the filtration of the dispersion through a filter medium. Obviously, if the addition of modifying agents to the slurry in order to improve filtration rate is to be commercially attractive, such addition must not adversely affect the structural or other properties of the resulting asbestos-cement products. For example, the addition of such modifying agents in the manufacture of asbestos pipe should not appreciably reduce the tensile strength modulus of rupture, or other properties of the pipe. Likewise, the pipe should not be made porous or caused to contain materials which would be leached out of the pipe by liquids flowing therethrough, so as to detrimentally affect the pipe or the conducted fluids. Also, if the added cost of inclusion of a filtration modifying agent would not be less than the saving in cost made possible by the use of such agents, then no overall reduction in the final cost of the desired product would be realized.

As is common with generally known methods for producing shaped articles by filtration of slurries of particulate material in water through a filter element, certain product losses are experienced in the manufacture of asbestos articles by this method. Thus, the filtrate, i.e., the so-called white water, removed from the collected mass of asbestos fibers and cement invariably contains quantities of unfiltered particulate solids, generally referred to as "fines." Such unfiltrated material often constitutes a waste product which contributes to the overall cost of the desired asbestos-cement structure for if the fines can be retained in the filtered asbestos-containing layer, rather than passing off with the filtrate, they contribute to the bulk of the final structure. Further, their reduction or elimination in the filtrate reduces the cost of handling or processing the filtrate and lowers the production costs.

OBJECTS

A principal object of this invention is the provision of new improvements in methods of producing shaped asbestos-cement articles by filtration of aqueous slurries comprising asbestos fibers and hydraulic cements. Further objects include:

(1) The provision of means for increasing the filtration rate of asbestos-cement slurries without in any way detrimentally affecting the physical properties of the sheets, pipes or other articles made from such slurries.

(2) Lowering the cost of producing shaped asbestos-cement articles by filtration of aqueous slurries of asbestos fibers and hydraulic cements by increasing the rate of production per equipment unit per unit of time.

(3) Reducing material losses in the production of asbestos pipe, sheets or the like from aqueous slurries by reducing the amounts of unfiltered solids passing through the filter elements with the filtrate.

(4) Provision of improvements in production of articles by filtration of aqueous slurries comprising asbestos fibers in hydraulic cement, which make possible the use of increased quantities of low cost asbestos fibers in the manufacturing operations.

(5) Reducing the tendency of drying felts and other belts or elements of the production equipment to clog while producing asbestos-cement articles by filtration of the aqueous slurries.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

GENERAL DESCRIPTION

The above objects are accomplished in accordance with the present invention by adding to aqueous slurries comprising asbestos fibers and hydraulic cement, prior to the filtration of the slurry to form a web or other shaped structure, between about 0.005 and 0.2% by weight, based upon the dry weight of the dispersed solids in the slurry, of a water-soluble, high-molecular weight polymer of an amide of the formula:

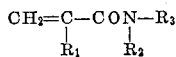

wherein $R_1$ is a radical selected from the group consisting of hydrogen and methyl and $R_2$ and $R_3$ are radicals selected from the group consisting of hydrogen, one to four carbon atom alkyl and one to four carbon hydroxyalkyl. This addition of the very small amount of the water-soluble polymer should be carried out in such fashion that the polymer is evenly distributed through the aqueous slurry quickly and in as short a time as possible before the slurry is subjected to filtration to form a wet asbestos-cement sheet or other mass therefrom. This is most satisfactorily accomplished by the addition of a weak solution, e.g., about 0.1 to 1% by weight, of the polymer in water to the aqueous slurry, e.g., by spraying or flowing the dilute aqueous solution of the polymer into the slurry held in a mixing vat or headbox of the filtration equipment utilized in the production of the asbestos-cement structure.

The success of the present invention is due to a large extent to the discovery that water-soluble polymers as described above, when added in the very minute amounts specified, increase the filtration rate of asbestos-cement slurries by at least 40% and very substantially reduce the quantity of unfiltered solids which are carried through the filter elements along with the filtrate in the product forming operations. These water-soluble polymers have been found to be rather specific in this regard in the processing of asbestos-cement slurries, since a wide variety of other materials previously disclosed to have filtration rate improving properties, when used in filtration of suspensions other than asbestos-cement slurries, have been found to be critically inferior to the specific polymers as above defined. As a matter of fact, this specific class of water-soluble polymers alone was found to materially benefit the asbestos-cement article manufacturing operations, and the other reagents investigated for this purpose were found to adversely affect filtration rate and other aspects of the production operations. Furthermore, these water-soluble polymers are effective at such low relative concentrations that they produce no detectable change whatsoever in the quality or properties of the final asbestos-cement articles.

EXAMPLES

A more complete understanding of the new methods for production of asbestos-cement articles as provided by the inventions described herein can be had by reference to the following examples describing actual operations in accordance with the invention. In these examples, all parts and percentages are by weight unless otherwise specified.

*Example I*

A dry powder mixture is prepared by tumbling together 20 percent asbestos fibers, 30 percent powdered silica, and 50 percent Portland cement.

In a separate container, a 0.10% solution of a commercial, water-soluble, high molecular weight acrylamide polymer sold under the trade name "Separan 2610" by the Dow Chemical Company, is prepared by adding 1 part by weight of the polymer to 1000 parts of water heated to 180° F., the mixture being stirred long enough to completely dissolve the polymer in the water.

A series of test samples of asbestos-cement composition, called "test cakes," are prepared using the dry powder mixture and polymer solution as described above. The first group of test cakes of the series is made without addition of any of the water-soluble polymers, to serve as a control for the remainder of the groups of test cakes in the series. To accomplish this, 150 parts of the asbestos fiber, silica and cement mixture are quickly poured into 1000 parts of water contained in a vessel of 3" x 8" rectangular cross-section provided with a funnel-like bottom which connects to a fast-opening valve and sewer discharge pipe. Above the bottom there is fixed across the vessel a fine sieve or screen which forms a filter element upon which solid materials dispersed in a liquid above the screen may be retained as liquid in the vessel and filtered through and out the sewer line. The mixture of dry powder and water is agitated for one minute with a vertically oscillating beater element, whereupon the discharge valve of the apparatus is thrown open to permit the water to drain through the rectangular filter element while the asbestos fibers and other suspended solids are, for the most part, retained upon the filter element. The time required for the water to filter completely through the filter element is measured in seconds and recorded.

Using the same procedure, four more test cakes are prepared to provide a group of five samples for the first group in the series to be prepared.

A second group of five samples is prepared using the same general procedure and apparatus as described above, except that, in addition to the 150 parts of the dried asbestos fiber, silica and cement mixture, 15 parts of the 0.1% polymer solution are also added to the 1000 parts of water. This results in the production of a group of five test cakes made from an aqueous slurry containing 0.01% by weight of the water-soluble polymer based upon the weight of solids contained in the slurry.

Operating in identical fashion, six more groups of sample test cakes are prepared, each with an increasing amount of water-soluble polymer contained in the slurry, namely, with 2, 3, 4, 5, 8 and 10 hundredths of a percent by weight of polymer based upon the dry weight of the solids in the slurry.

The filtration time in seconds (average) recorded for each of the separate eight groups of test samples is given in the following Table I:

TABLE I

| Percent Polymer | none | .01 | .02 | .03 | .04 | .05 | .08 | .10 |
|---|---|---|---|---|---|---|---|---|
| Filter Time | 55 | 27 | 25 | 20 | 20 | 20 | 24 | 28 |

*Example II*

A dry powder mixture is prepared by tumbling together 20% asbestos fibers, 30% powdered silica and 50% Portland cement.

Aqueous solutions containing 0.1% of the following water-soluble, high molecular weight organic products are prepared by adding one part of each of the following specified products to 1000 parts of water heated to 180° F. and agitated by a propeller type stirrer, the stirring being continued sufficiently long to produce a homogeneous solution of the product:

Product A—A polyoxypropylene polyoxyethylene condensates surface active agent sold under the trade name "Pluronic L-62LF" by Wyandotte Chemical Co.

Product B—Quaternary ammonium salt flocculating agent sold under the trade name "Arquad 2HT-T" by Armour & Co.

Product C—Polyethylene oxide floccoulating agent sold under the trade name "Polyox" by Union Carbide & Carbon Corp.

Product D—Water soluble, high molecular weight acrylamide polymer sold under the trade name "Aeroflox 550" by American Cyanamid Co.

Product E—Water-soluble, high-molecular weight acrylamide polymer sold under the trade name "Pam 200" by American Cyanamid Co.

Product F—Water-soluble, high-molecular weight acrylamide polymer sold under the trade name "Separan 2610" by Dow Chemical Co.

Following the procedure for producing test cakes as described in Example I above, groups of five samples of each of the products A through F in the concentration of 1, 2, 3, 4, 5, 7 and 9 hundredths percent are prepared to determine the average filter time in seconds for each of the different groups of test samples. The results of these filtration rate tests are recorded in the following table:

TABLE II

| Percent Polymer | None | .01 | .02 | .03 | .04 | .05 | .07 | .09 |
|---|---|---|---|---|---|---|---|---|
| Product A | 75 | 80 | 80 | 85 | 86 | 90 | 95 | 100 |
| Product B | 60 | 65 | 67 | 69 | 69 | 70 | 71 | 72 |
| Product C | 64 | 72 | 110 | 152 | 179 | 226 | 281 | 312 |
| Product D | 63 | 45 | 41 | 38 | 35 | 34 | 29 | 30 |
| Product E | 58 | 34 | 28 | 28 | 32 | 34 | 41 | 45 |
| Product F | 56 | 28 | 25 | 23 | 22 | 24 | 27 | 30 |

*Example III*

In a dry powder mixer, 20% asbestos fibers of the type commonly employed in the manufacture of asbestos-cement pipe are mixed together with 30% of clean-fine sand and 50% of Portland cement.

In a separate tank, a 0.1% aqueous solution of water-soluble, high molecular weight acrylamide polymer (Separan 2610) is prepared by adding 1 part of the polymer to 1000 parts of water heated to 180° F. and agitated for about ten minutes in order to completely dissolve the polymer in the water.

An asbestos-cement slurry is continuously formed by flowing through separate conduits into a beater tank equipped with rotary paddle type agitators, a stream of water, a stream of the acrylamide polymer solution, and a stream of the dry powder mixture of asbestos fibers, sand and cement, the streamwise flow of the separate materials being controlled so that 60 parts of the polymer solution and 150 parts of the dry powder mixture flow into the tank for each 1000 parts of water. As the indicated ingredients are added streamwise to the beater tank and mixed therein, an equal volume of the resulting slurry is withdrawn through a suitable outlet in the beater tank and is conveyed to the leveling vat of an asbestos pipe making machine of the type shown and described in U.S. Patent 2,246,537. Using the procedure as described in the patent, the slurry is converted by filtration through the rotary cylinder mold into a thin continuous sheet of asbestos fibers fixed in a matrix comprising the Portland cement and sand. This thin, wet sheet or felt is continuously removed from the cylinder mold, conveyed by a traveling belt over a suction box where more of the water is removed, and it is then spirally wound up on a mandrel while it is subjected to pressure to compress the overlapping layers together to form a substantially unified tube or pipe.

In another case, pipe is similarly made from the dry asbestos-cement-sand mixture, but without addition of the acrylamide polymer. It is found that the overall production rate of the pipe is increased about 20% and the filtration rate of the slurry is increased about 60% when the polymer containing slurrry is used, as compared with operations using the aqueous slurry which contains no such polymer. Furthermore, it is found that the white water contains less than ½ the amount of unfiltered solids when the polymer containing slurry is employed, as compared with operations using the aqueous slurry which contains none of the polymer. In addition, the endless felt belt used to transfer the asbestos sheet from the cylindrical mold to the winding mandrel can be used over substantially longer periods of time without changing because there is less plugging or clogging of the belt when the slurry containing the water-soluble polymer is employed as compared with manufacture of the pipe from a slurry which does not contain the very small amount of polymer.

DETAILED DESCRIPTION

It will be apparent from the above discussion and particularly the data set forth in Table II, that water-soluble, high molecular weight polymers having a structure as hereinbefore defined possess a rather specific modifying action upon filtration of aqueous slurries comprising asbestos fibers and hydraulic cements in the formation or molding of solid components from such slurries. In carrying out the methods of this invention, it is preferable to use water-soluble polymers which are of the "non-ionic" type and the most effective commercial product in this category is "Separan 2610" sold by the Dow Chemical Company. Additional acrylamide polymers which are commercially available and which may be used in carrying out the new methods herein described include:

"Aerofloc 550" (American Cyanamid Co.)
"Pam 200" (American Cyanamid Co.)

Water soluble, high molecular weight polymers of this type may be prepared by polymerization, in the presence of suitable catalysts, e.g., peroxide catalysts of acrylamide, methacrylamide or N-substituted derivatives thereof containing alkyl or hydroxy alkyl substituents having up to 4 carbon atoms. Such water soluble polymers can be prepared from a single monomer or a mixture of monomers. In addition, minor amounts, e.g., 50% or less, of other copolymerizable materials may be employed in the monomeric mixtures used to form the water soluble polymers. Examples of other copolymerizable materials include: acrylonitrile, maleic anhydride, vinyl esters, such as vinyl acetate, vinyl ethers such as vinyl ethyl ether, acrylic acid, methacrylic acid and the like. Copolymers of this type formed of a vinyl ester may be subjected to hydrolyzing conditions which will convert at least part of the ester groups of the polymer molecule into hydroxyl groups creating a vinyl alcohol containing polymer. Similarly, copolymers containing acid anhydride groups, such as those made from maleic acid may be reacted to form carboxyl salt groups.

Obviously, the use of copolymerizing materials which tend to impart hydrophobic properties to the resulting polymers must be used in sufficiently low quantities that the resulting polymers remain water soluble enough so that up to at least about 1% by weight of the polymer may be dissolved in water.

The water-soluble polymers are effective for the purpose described at very low concentrations, i.e., as low as 0.005% by weight based upon the dry weight of the dispersed solids in the aqueous slurries. Actually, too large an amount of polymer, i.e., above about 0.2%, will give less beneficial results than a smaller amount. Each individual polymer appears to have an optimum concentration for maximum effect, but for most of them, this will be between about 0.01 and 0.1 percent by weight, based on the dry weight of the dispersed solids.

The filtration rate increasing properties of the specified water-soluble polymers appear only with asbestos fibers which acquire a positive charge when suspended in water. This means that the beneficial effects of the water-soluble polymers are primarily experienced in the processing of slurries containing chrysotile asbestos fibers. However, the kinds of asbestos which acquire a negative charge when suspended in aqueous medium, i.e., amphiboles, which includes crocidolite, anthophyllite and tremolite, do not adversely affect the filtration modifying properties of the polymers when such fibers are present in the aqueous slurries being processed. Accordingly, the amphibole class of asbestos fibers may be included in various amounts, usually 50% by weight or less, of the total weight of asbestos fibers used in forming the slurries.

Portland cement is the principal hydraulic cementitious material to be used in carrying out the new methods of preparing asbestos-cement structures in accordance with this invention. Actually, the action of the filtration modifying agents has been found to be specifically superior with combinations comprising chrysotile asbestos and Portland cement. However, use of other hydraulic cements, e.g., pozzolanic cement, calcium aluminate cement and calcium sulphate cement, can be used, if desired, to replace at least part of Portland cement in forming the binder matrix from the asbestos fibers.

Suitable asbestos-cement structures can be prepared using mixtures consisting essentially of the cement and asbestos fibers. However, it is often desirable from a viewpoint of cost, as well as structural properties of the final products, to include additional siliceous materials in the aqueous slurries so that they will constitute a part of the ultimate shaped structures. This includes sand, powdered silica, ground mica, ground feldspar and the like.

The cement content of the solids in the aqueous slurries should constitute between about 1 to 5 parts by weight for each part of asbestos. If finely subdivided silicous material such as sand or powdered silica is also included in the asbestos-cement compositions, this may be used in amounts up to 3 parts of the silicious material for each part of asbestos in the mixture. The total solids content of the slurries may be varied, but preferably should constitute about 0.5 to 5 parts by weight for each 100 parts of water.

The particular use for the asbestos-cement products produced in accordance with the invention may require that the structures be colored. Coloring of the product can be accomplished by incorporating dyes or pigments or by including colored fibers, such as glass fibers, in the compositions. The particular amount of added coloring materials will depend primarily upon the degree of coloring required in the final products, but usually up to about 10% of such pigments, colored fibers or the like will be found sufficient.

Specific apparatus for use in forming asbestos-cement pipe has been referred to above, but any type of equipment known to be useful for the molding or shaping of asbestos-cement articles by filtration of aqueous slurries may be used in carrying out the new methods. As a matter of fact, one of the principal attributes of the new methods is the fact that they may be employed with the established and known asbestos pipe and board forming apparatus, and without need for special training of personnel operating the equipment.

CONCLUSION

The foregoing specification describes new improvements in the production of shaped articles from aqueous slurries of asbestos and hydraulic cements by filtration which make it possible to carry out such operations with very substantial increases in the rate of production. Furthermore, the utilization of the specific filtration modifying agents as described make possible improved material usage, clearer white water, less plugging of filter elements and drying felts, and the ability to use higher percentages of low cost asbestos fibers in the production of asbestos-cement articles. Accordingly, these improved methods lead to appreciable reductions in the ultimate cost of the asbestos-cement pipe and related articles.

Having provided a complete description of the invention in such manner as to distinguish it from other inventions and from what is old, and having provided a description of the best mode contemplated of carrying out the invention, the scope of patent protection to be granted the invention is defined by the following claims.

We claim:

In a method of producing asbestos-cement pipe having good strength properties by:
(A) forming a slurry comprising
  (1) water, and
  (2) particulate solids in amount between about 0.5 and about 5 parts by weight dispersed in 100 parts by weight of the water, said particulate solids comprising:
    (a) asbestos fibers, and
    (b) hydraulic cement
  in a weight ratio of asbestos to cement between about 1 to 5 and about 1 to 1,
(B) mixing and maintaining the solids of said slurry dispersed therethrough under agitation;
(C) feeding said slurry to a rotary cylinder mold vat of a machine containing a rotary cylinder mold, and continuing the agitation of said slurry in said cylinder mold vat to maintain the dispersion of the solids in the slurry;
(D) forming from said slurry, by filtration thereof through said rotary cylinder mold, a thin, continuous sheet comprising said asbestos fibers dispersed in a solid matrix comprising said hydraulic cement;
(E) winding said sheet around a mandrel to form a plurality of superposed layers of said sheet on the mandrel and applying compressive forces to said layers to consolidate them into a handleable but principally uncured tubular asbestos-cement article;
(F) removing said tubular article from the mandrel; and
(G) curing said tubular article to form a cured asbestos-cement pipe having good strength properties;

the improvement comprising, in combination:
(H) employing, as said asbestos fibers, asbestos fibers comprising chrysotile asbestos fibers, which acquire a positive charge when suspended in water, and including in said slurry between about 0.005 percent and about 0.1 percent by weight, based upon the weight of the dispersed solids in the slurry, of a water-soluble, high-molecular-weight polymer of an amide of the formula:

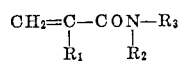

wherein $R_1$ is a radical selected from the group consisting of hydrogen and methyl, and $R_2$ and $R_3$ are radicals selected from the group consisting of hydrogen, one-to-four-carbon-atom alkyl, and one-to-four-carbon-atom hydroxy alkyl.

(References on following page)

References Cited in the file of this patent

UNITED STATES PATENTS

| | | |
|---|---|---|
| 2,220,386 | Badollet | Nov. 5, 1940 |
| 2,246,537 | Rembert | June 24, 1941 |
| 2,778,283 | Bettoli | Jan. 22, 1957 |
| 2,838,397 | Gruntfest et al. | June 10, 1958 |

OTHER REFERENCES

Schweitzer: "The Creaming of Rubber Latex," Rubber Chemistry and Technology, vol. 13 (1940), page 412.

Dow: "Diamond," vol. 18, No. 1, March 1955, Dow Chemical Co., Midland, Michigan, pages 1–4.

"Separan 2610 in the Pulp and Paper Industry," Dow Chemical Co., Midland, Michigan, June 1956, pages 1–18.

La Mer et al.: "The Preparation and Evaluation of Superior Flocculating Agents for Phosphate Slimes," NYO–7403, October 30, 1956, Technical Information Service Extension, Oak Ridge, Tenn., pp. 1–8.

Black et al.: "Effectiveness of Polyelectrolyte Coagulant Aids in Turbidity Removal," February 1959, Journal A.W.W.A., page 248.